(No Model.) C. WACHTEL. 3 Sheets—Sheet 1.
ELECTRIC FAN.
No. 525,730. Patented Sept. 11, 1894.
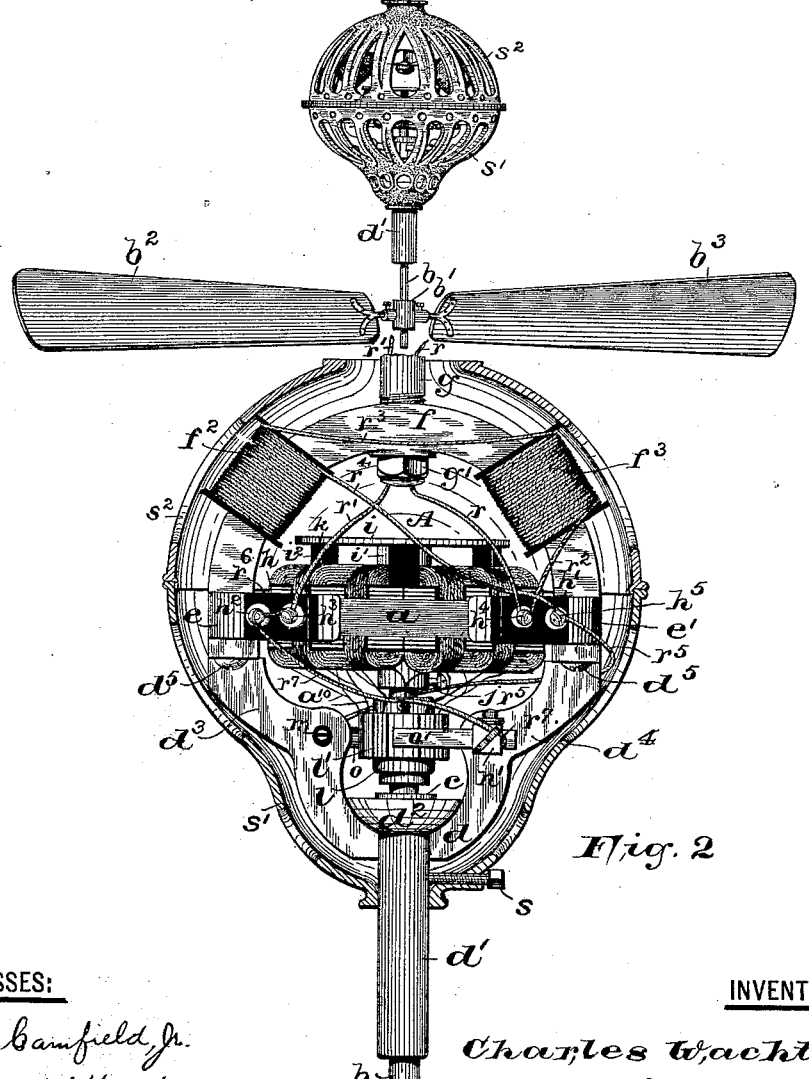
WITNESSES:
Wm. H. Camfield, Jr.
G. Basil Hooper
INVENTOR:
Charles Wachtel,
BY Fred'k C. Fraentzel, ATT'Y.

(No Model.) 3 Sheets—Sheet 2.

C. WACHTEL.
ELECTRIC FAN.

No. 525,730. Patented Sept. 11, 1894.

WITNESSES:
Wm. H. Camfield Jr.
Basil Hooker

INVENTOR:
Charles Wachtel,
BY Fred K. Fraentzel, ATT'Y.

(No Model.) 3 Sheets—Sheet 3.
C. WACHTEL.
ELECTRIC FAN.

No. 525,730. Patented Sept. 11, 1894.

WITNESSES:
Wm. H. Canfield Jr.
D Basil Hooper

INVENTOR:
Charles Wachtel,
BY Fred C. Fraentzel, ATT'Y.

UNITED STATES PATENT OFFICE.

CHARLES WACHTEL, OF NEWARK, NEW JERSEY.

ELECTRIC FAN.

SPECIFICATION forming part of Letters Patent No. 525,730, dated September 11, 1894.

Application filed January 17, 1893. Renewed February 23, 1894. Serial No. 501,287. (No model.)

*To all whom it may concern:*

Be it known that I, CHARLES WACHTEL, a citizen of the United States, residing at Newark, in the county of Essex and State of New Jersey, have invented certain new and useful Improvements in Electric Fans; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has for its object to provide an improved form of electric fan, and has for its main purpose to improve the construction thereof with a view to increasing the efficiency and at the same time cheapening the cost of manufacture of the fan.

The invention therefore consists of certain novel arrangements and combinations of parts, such as will be hereinafter more fully described in the accompanying specification and finally embodied in the clauses of the claim hereto appended.

Figure 3:
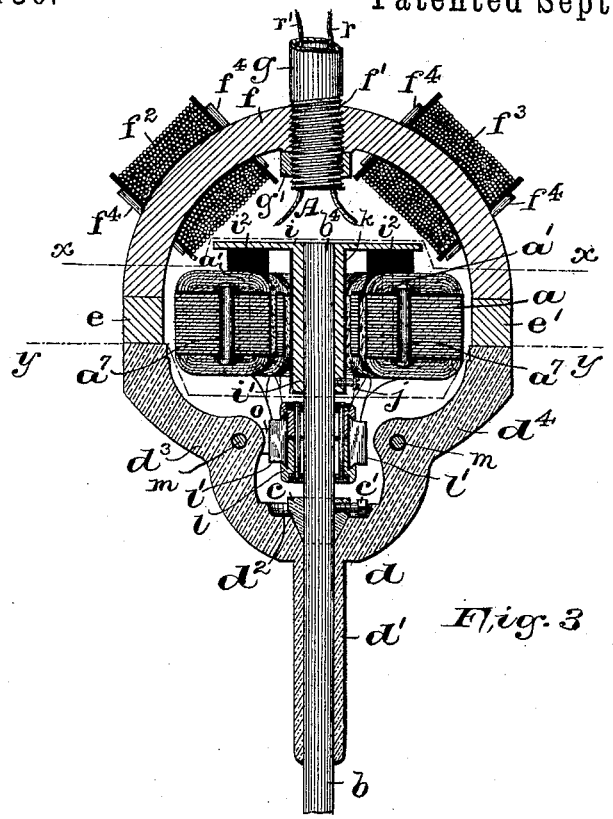
Figure 4:
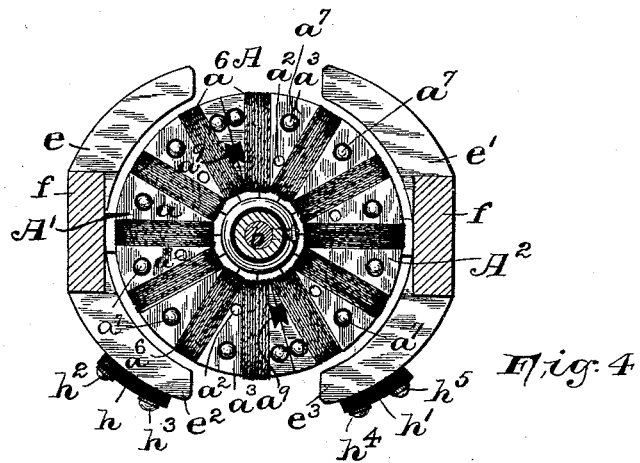
Figure 5:
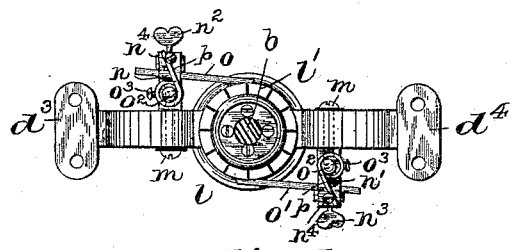
Figure 6:
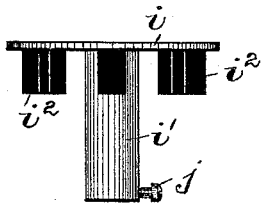
Figure 8:
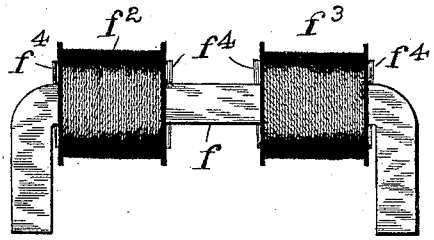
Figure 7:
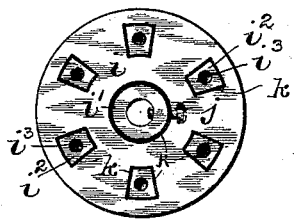
Figure 9:
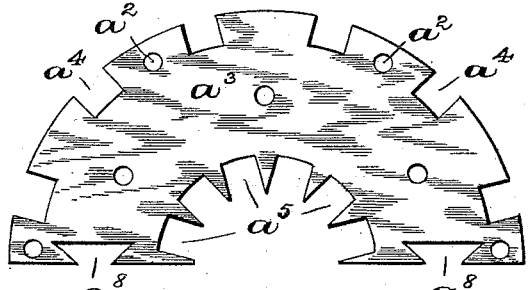

In the drawings herewith accompanying, Figure 1 is a front elevation of my improved electric rotary fan, clearly illustrating on the fan-shaft, an inclosing casing in which is arranged the electric motor for driving the fan-shaft and its fans. Fig. 2 is an enlarged detail view of the electric motor, to more clearly illustrate the arrangement and construction of the several parts thereof, the motor being represented in side elevation and the inclosing casing in vertical section. Fig. 3 is a vertical section of the electric motor, to more clearly illustrate the manner of securing the armature plates or sections together, as well as securing the complete armature to holding plate or armature support on the fan-shaft. Fig. 4 is a horizontal section taken on line $x$ in Fig. 3, showing in plan the arrangement of the armature sections and the wire coils wound thereon. Fig. 5 is a similar section taken on line $y$ in said Fig. 3, illustrating the lower part of the supporting frame or motor-securing frame, for supporting the field coils and their frame, and also illustrating in plan the commutator and spring-actuated brushes secured on said supporting frame. Fig. 6 is a side view of the supporting plate or armature carrier, to which the armature is attached, as indicated in Fig. 3, and Fig. 7 is a view of the under side of said plate. Fig. 8 is a view of a modified form of frame for supporting the field coils, and Fig. 9 is a plan view of one form of armature plate or section.

Similar letters of reference are employed in each of the above described views to indicate like parts in the several figures of the drawings.

The electric motor A employed in my improved form of fan, is clearly illustrated in Figs. 2, 3 and 4, the armature of which is firmly secured to the fan-shaft $b$, as will be more fully described hereinafter. As will be seen from Figs. 1 and 3, said fan-shaft $b$, which is provided at its lower end with a holding socket $b'$ of any suitable construction, from which extend the fan-blades $b^2$ and $b^3$, is rotatively secured, by means of a suitable collar $c$, which is preferably cone-shaped, and a set screw $c'$, in a sleeve or bearing $d'$ arranged on the main supporting frame $d$ of non-conducting metal. Said collar $c$, as has been stated, is preferably conical and rotates within a correspondingly shaped bearing portion in the enlargement $d^2$ connected with the top of said sleeve $d'$, as will be seen from Fig. 2 and said Fig. 3. The main frame $d$, which is made in the form of a yoke, thereby providing the two supports $d^3$ and $d^4$, has secured on the top of each support, by means of screws or bolts $d^5$, the two main castings $e$ and $e'$ of soft iron, each forming a pole-piece, and secured on the top of these pole-pieces is a bridge-piece $f$ forming the core of the field magnet, and which may be formed in the shape of an inverted U, either as illustrated in Figs. 2 and 3, or as shown in Fig. 8. Said screws or bolts $d^5$, which pass entirely through the pole-pieces $e$ and $e'$ are screwed into the leg-portions of said core $f$ of the field magnet, whereby these parts are firmly held and secured to the supports $d^3$ and $d^4$ of the main frame portion $d$, as will be clearly evident. Said core $f$ is provided in the top thereof with a screw-threaded hole $f'$ into which is screwed the threaded end of a suitably suspended tubular support or pipe $g$ provided with a lock nut $g'$, as shown. Said pipe may be provided at the top with an ornamental rosette $g^2$ and means, such as a hook, for securing and suspending the device from the ceiling.

As will be evident, the two pole-pieces $e$ and $e'$ secured to the core $f$ and the field coils $f^2$ and $f^3$ arranged on said core $f$ constitute the field magnet, said coils being properly held in place by suitable pins or keys $f^4$ arranged in perforations to either side of said coils, as will be seen from Fig. 3, or said coils may be secured to said bridge-piece in any other well-known manner. The pole-pieces $e$ and $e'$ are concave on their inner surfaces and may be convex on their outer surfaces, as clearly shown in Fig. 4, and to the ends $e^2$ and $e^3$ of said castings $e$ and $e'$ respectively, are secured the plates $h$ and $h'$ of non-conducting material, such as fiber or rubber, which are provided with the binding screws $h^2$ and $h^3$ on the plate $h$ and the binding screws $h^4$ and $h^5$ on the plate $h'$.

As will be seen from Figs. 2 and 3, the fan-shaft $b$ extends up between the two supports $d^3$ and $d^4$ of the main frame $d$, and on the upper portion $b^4$ of said shaft $b$, I have arranged an armature carrier or supporting plate $i$ provided with a sleeve $i'$ by means of which said plate is fitted upon the end $b^4$ of said shaft $b$ and is secured in position thereon by a set screw or bolt $j$. From the under side of said plate $i$ project a suitable number of lugs $i^2$ having screw-holes $i^3$ therein to which the armature $a$ of the electric motor A is secured by screws or bolts $a'$ passing through holes $a^2$ in the armature sections or plates $a^3$, as clearly indicated in dotted lines in said Fig. 3. As will be noticed from said Fig. 3, the under side of said plate $i$ and the lugs $i^2$, as well as the sleeve $i'$, are covered with an insulating material $k$.

The armature $a$, consists of a suitable number of armature sections or plates $a^3$, which are suitably insulated from each other, said plates peing preferably formed in half section, as shown in Fig. 9, and being preferably provided with the recesses $a^4$ on the outer rim and recesses $a^5$ on the inner rim of each plate, in which the armature wires $a^6$ are arranged in coils, as clearly shown in Fig. 4, the whole being secured together by small bolts or rivets $a^7$, which are suitably insulated. Each half-section is provided with a $\bigtriangledown$-shaped recess $a^8$, and when the several and previously secured half-sections are placed together to form the two completed armature sections A' and A², (see Fig. 4) said recesses $a^8$ will correspond, and form a $\bowtie$-shaped opening or hole into which a correspondingly shaped key or wedge $a^9$ is driven, thereby firmly drawing the sections A' and A² toward each other and forming the complete armature for the electric motor A, as will be clearly understood. When the armature $a$ has thus been completed and is secured in position to the lugs $i^2$ on the supporting plate or armature carrier $i$, the free ends $a^{10}$ of the wire coils $a^6$ are connected with the commutator sections $l'$ of the commutator $l$, as shown in said Figs. 2 and 3. Of course it will be understood, that I may use any suitable form of commutator, but I prefer to use the commutator illustrated and claimed by me in my previous application, filed June 13, 1892, Serial No. 436,470, and I will therefore not further describe the construction of the commutator, the same being securely fastened to the fan-shaft in any convenient manner, and rotating with the shaft $b$, as will be understood.

To the supports $d^3$ and $d^4$ of the main frame $d$ are secured by means of insulated screws or bolts $m$, see Figs. 3 and 5, suitable posts $n$ and $n'$ respectively, in which are held in suitable slots, by means of thumb-screws $n^2$ and $n^3$ respectively, the brushes $o$ and $o'$, which bear against the commutator sections $l'$. To cause the free ends of said brushes to bear against the commutator sections, said brushes are pivotally arranged in the slotted portions of said posts $n$ and $n'$ by means of a screw or post $o^2$ on each brush, to which is secured a suitable spring $p$, which encircles said post $o^2$ and the free end of which bears against a screw or pin $n^4$. By this means the free ends of the brushes $o$ and $o'$ can be made to bear with greater or less force against the commutator sections during their revolutions with the shaft $b$, by tightening or loosening certain screws $o^3$ and thereby adjusting the springs $p$ connected therewith, as will be evident from Fig. 5.

Having thus described the general construction and arrangement of the several parts of my improved electric fan, I will now describe the wire connections and the operation of the device for rotating the fan blades. The conductors or wires $r$ and $r'$ for conducting the electric current to the machine are passed through the pipe $g$ and extend therefrom at the bottom, said wire $r$ being connected with the binding post $h^4$ on the insulating piece $h'$, and the wire $r'$ being connected with the binding post $h^3$ on the insulating piece $h$. From said post $h^4$ leads a wire $r^2$ to the coil $f^3$, which is connected with the coil $f^2$ by the wire $r^3$. A wire $r^4$ connects the coil $f^2$ with the post $h^5$ from which a wire $r^5$ runs to the brush $o$ on the opposite side of the machine. On the insulating piece $h$ the binding posts $h^2$ and $h^3$ are connected by a wire $r^6$ and from the post $h^2$ a wire $r^7$ leads to the brush $o'$, the commutator establishing the completed circuit, whereby when the current of electricity is turned on, the electric motor connected with the fan shaft will begin to operate and rotate the shaft $b$ and hence the fan blades secured to the lower end thereof. As will be seen from Figs. 1 and 2, I can secure to the sleeve $d'$ by means of a screw $s$ a suitable ornamental casing, which is preferably made of fiber or rubber, and consists of a lower half-section $s'$ and an upper half-section $s^2$, the two sections being placed on each other and interlocking, substantially as illustrated in said Fig. 2.

By my improved form of operating mechanism as applied to the herein described electric fan, I have devised a very economic machine, in which the parts are easily put together, and one, in which the electric motor is directly secured to the fan-shaft, thereby driving the same and obtaining a high speed for the fan-shaft, without the use of intermediate gearing now used for rotating the shaft in electric fans as now made, thereby producing less resistance and resulting in a noiselessly operated fan. By the use of the hollow armature, I provide for a free circulation of air around the shaft and the motor is kept perfectly cool while running.

The herein described electric fan is cheap, simple, and easily put together, and is found to be highly efficient.

Having thus described my invention, what I claim is—

1. A suspended electric fan provided with a tubular support forming a conduit for the wires for conducting the current, a bridge-piece core provided with pole-pieces attached to said support, a main supporting frame secured to said bridge-piece core, provided with a bearing, a fan-shaft adapted to rotate in said bearing, means on said shaft for rotatively securing said shaft in the bearing, a supporting plate or armature carrier on said shaft, consisting essentially of a plate $i$ provided with a sleeve $i'$ and a screw for securing the same to said fan-shaft, lugs $i^2$ on the under side of said plate $i$ provided with screw-holes, and an armature having screws or bolts $a'$ passing through the armature sections thereof and screwed into said holes in the lugs $i^2$ for securing the same to the said carrier or supporting plate, substantially as and for the purposes set forth.

2. In an electric fan, the combination, with a suspended tubular support, through which the conducting wires pass, of a motor support, consisting of a bridge-piece or core $f$ provided with field coils, pole-pieces $e$ and $e'$ at the ends of said bridge-piece, a main support $d$ secured to said pole-pieces, said support $d$ comprising therein a sleeve $d'$ and a cup-shaped enlargement $d^2$ on said sleeve, a fan-shaft adapted to rotate in said sleeve, a collar $c$ for rotatively securing said shaft in said sleeve, a supporting plate or armature carrier on said shaft, and an armature secured to said supporting plate or carrier, substantially as and for the purposes set forth.

3. In an electric fan, the combination, with a suspended tubular support, through which the conducting wires pass, of a motor support, consisting of a bridge-piece or core $f$ provided with field coils, pole-pieces $e$ and $e'$ at the ends of said bridge-piece or core, a main support $d$ secured to said castings, said support $d$ comprising therein a sleeve $d'$ and a cup-shaped enlargement $d^2$ on said sleeve, a fan-shaft adapted to rotate in said sleeve, a collar $c$ for rotatively securing said shaft in said sleeve, a supporting plate or armature carrier on said shaft, consisting essentially of a plate $i$ provided with a sleeve $i'$ and a screw for securing the same to said fan-shaft, lugs $i^2$ on the under side of said plate $i$ provided with screw-holes, and an armature having screws or bolts $a'$ passing through the armature sections thereof and screwed into said holes in the lugs $i^2$ for securing the same to said supporting plate or carrier, substantially as and for the purposes set forth.

4. In an electric fan, the combination, with a suspended tubular support, through which the conducting wires pass, of a motor support, consisting of a bridge-piece or core $f$ provided with field coils, pole-pieces $e$ and $e'$ at the ends of said bridge-piece or core, a main support $d$ secured to said castings, said support $d$ comprising therein a sleeve $d'$ and a cup-shaped enlargement $d^2$ on said sleeve, a fan-shaft adapted to rotate in said sleeve, a collar $c$ for rotatively securing said shaft in said sleeve, a supporting plate or armature carrier on said shaft, consisting essentially of a plate $i$ provided with a sleeve $i'$ and a screw for securing the same to said fan-shaft, lugs $i^2$ on the under side of said plate $i$ provided with screw-holes, and an armature having screws or bolts $a'$ passing through the armature sections thereof and screwed into said holes in the lugs $i^2$ for securing the same to said supporting plate or carrier, and said armature herein set forth, comprising therein, the armature plates or sections $a^3$, having $\bigvee$-shaped recesses $a^8$, and a correspondingly shaped key in said recesses for securing the armature sections together, substantially as and for the purposes set forth.

5. A suspended electric fan having a main frame $d$ provided at its lower end with a sleeve $d'$, a cup-shaped enlargement $d^2$ and supports $d^3$ and $d^4$, combined with a bridge-piece or core $f$ and pole-pieces $e$ and $e'$, and a fan-shaft in said sleeve $d'$, a cone-shaped collar $c'$, for rotatively securing said shaft in said cup-shaped enlargement, and an armature connected with said shaft, substantially as and for the purposes set forth.

6. The combination, in a suspended electric fan, of a supporting frame and a fan-shaft rotatively arranged thereon, a supporting plate or armature-carrier on said shaft, consisting of a plate $i$, a sleeve $i'$ and a set-screw thereon, lugs $i^2$ on the lower side of said plate $i$ provided with screw-holes, and an armature secured to said lugs, substantially as and for the purposes set forth.

7. A suspended electric fan having a main frame $d$ provided at its lower end with a sleeve $d'$, a cup-shaped enlargement $d^2$ and supports $d^3$ and $d^4$, combined with a bridge-piece or core $f$ and castings $e$ and $e'$, a fan-shaft in said sleeve $d'$, means for rotatively securing the same in said cup-shaped enlargement, an armature connected with said shaft, a commutator on said shaft, and brush-holders pivotally mounted on said supports $d^3$ and $d^4$, provided with brushes bearing against the commutator sections, substantially as and for the purposes set forth.

8. A suspended electric fan having a main frame $d$ provided at its lower end with a sleeve $d'$, a cup-shaped enlargement $d^2$ and supports $d^3$ and $d^4$, combined with a bridge-piece or core $f$ and castings $e$ and $e'$, a fan-shaft in said sleeve $d'$, means for rotatively securing the same in said cup-shaped enlargement, an armature connected with said shaft, a commutator on said shaft, and brush-holders pivotally mounted on said supports $d^3$ and $d^4$, consisting essentially of posts $n$ and $n'$, brushes $o$ and $o'$, pivots $o^2$, screws $n^4$ on said posts $n$ and $n'$, springs $p$, and adjusting screws $o^3$, substantially as and for the purposes set forth.

9. In an electric fan, the combination, with a fan-shaft and an electric motor connected therewith, of a supporting frame, consisting essentially of a main frame $d$ provided with a sleeve $d'$ and a cup-shaped enlargement $d^2$, supports $d^3$ and $d^4$ on said frame $d$, pole-pieces $e$ and $e'$ on said supports, and a bridge-piece $f$, and means for securing said bridge-piece or core and said pole-pieces $e$ and $e'$ on the free ends of said supports $d^3$ and $d^4$, substantially as and for the purposes set forth.

In testimony that I claim the invention set forth above I have hereunto set my hand this 13th day of January, 1893.

CHARLES WACHTEL.

Witnesses:
FREDK. C. FRAENTZEL,
WM. II. CAMFIELD, Jr.